United States Patent [19]

Ikenaga

[11] Patent Number: 4,929,109
[45] Date of Patent: May 29, 1990

[54] INK CARTRIDGE

[75] Inventor: Yasunori Ikenaga, Nara, Japan

[73] Assignee: Sharp Kabushiki Kaisha, Osaka, Japan

[21] Appl. No.: 414,300

[22] Filed: Sep. 29, 1989

[30] Foreign Application Priority Data

Oct. 3, 1988 [JP] Japan .......................... 63-129745[U]

[51] Int. Cl.$^5$ .................... B43K 23/02; B43K 5/14; B43K 7/02; G01D 15/16
[52] U.S. Cl. .................... 101/134; 401/131; 401/132; 401/133; 401/217; 346/140 R; 346/75; 222/80; 222/325
[58] Field of Search .................... 401/131–135, 401/217; 346/140 R, 75; 222/80, 325, 420, 422

[56] References Cited

U.S. PATENT DOCUMENTS 2,500,998  3/1950  Morris .......................... 401/217

FOREIGN PATENT DOCUMENTS 154091  11/1953  Australia .......................... 401/217
49271  11/1938  France .......................... 401/133
8200824  10/1983  Netherlands .......................... 401/217
2001285  1/1979  United Kingdom .......................... 401/134

Primary Examiner—Robert A. Hafer
Assistant Examiner—Kerry Owens
Attorney, Agent, or Firm—Nixon & Vanderhye

[57] ABSTRACT

An ink cartridge comprising sealing members sealing openings of both ends of the cartridge body, a holder cap fitted around the upper end of the cartridge body; a seal opener connected to the lower end of an operating shaft inserted through a guide hole in the upper end of the holder cap; an elastic member urging the seal opener in the upward direction to separate it from the upper sealing member; and a seal packing provided on the upper end surface of the seal opener and pressed onto the upper inner surface of the holder cap by the urging force of the elastic member to block an air inlet that is formed by a gap between the operating shaft and the guide hole, the operating shaft being pushed downward against the urging force of the elastic member to cause the upper sealing member to be torn open by the seal opener, thereby preventing the ink from flowing into the ink tank, as desired, which makes it possible to control the quantity of ink to be supplied to the ink tank.

3 Claims, 3 Drawing Sheets

INK CARTRIDGE

BACKGROUND OF THE INVENTION

1. Field of the Invention

The present invention relates to an ink cartridge for supplying ink to an ink tank in an ink jet printer.

2. Description of the Prior Art

As shown in FIG. 6, a conventional ink cartridge is so constructed that the openings at both ends of a cartridge body 1 of an approximately cylindrical shape are respectively sealed with sealing films 2 and 3 to seal ink 4 in the cartridge body 1. To supply the ink 4 to an ink tank 5 in an ink jet printer, a sealing cap (not shown) is removed from a filler hole 6 of the ink tank 5, after which one end of the cartridge body 1 is inserted into the filler hole 6, causing the sealing film 2 on the one end of the cartridge body 1 to be torn open by a piercing projection 7 formed inside of the filler hole 6. Next, a piercing member 8 is fitted onto the other end of the cartridge body 1, and pushed downward till it stops, as shown by a dashed line in FIG. 6, at a stopping flange 9 formed around the outer circumferential surface of the cartridge body 1. This causes the sealing film 3 on the other end of the cartridge body 1 to be torn open by a seal opener 10 provided inside of the piercing member 8, allowing air to flow through an air inlet 11 formed in the piercing member 8 and through the torn sealing film 3 into the cartridge body 1, the air acting to push the ink 4 into the ink tank 5 through the torn sealing film 2.

However, since the construction of the abovementioned ink cartridge is such that the flowing of the ink 4 cannot be stopped in the middle once both the sealing films 2 and 3 are torn open, an erroneous operating procedure will cause the ink 4 to leak out onto adjacent areas of the ink jet printer. For example, after the one end of the cartridge body 1 has been inserted into the filler hole 6 of the ink tank 5, the cartridge body 1 may be drawn out of the filler hole 6 to see if the sealing film 2 on that end has properly been torn open. At this time, if the sealing film 3 on the other end is accidentally pierced by the piercing member 8, the ink 4 will be allowed to flow out. Furthermore, since an indicator is generally not provided an indicator for indicating the remaining level of the ink 4 in the ink tank 5, it is often the case with ink jet printers to fill the ink tank 5 up to the full ink level for fear that the ink might run out during the operation thereof. In this case, if the cartridge body 1 is inserted in the filler hole 6 even when the ink tank 5 is not at the ink empty level (the minimum ink level), oversupply of the ink 4 will occur with no means of stopping the ink 4 from leaking through the filler hole 6.

SUMMARY OF THE INVENTION

The ink cartridge of the present invention, which overcomes the above-discussed and numerous other disadvantages and deficiencies of the prior art, comprises a cylindrically shaped cartridge body, both ends of which have openings that are sealed with sealing members to seal ink in said cartridge body, the sealing members being torn open to supply the ink to an ink tank in an ink jet printer through the lower opened end of the cartridge body inserted in the ink tank; a cylindrically shaped holder cap having a closed end and fitted around the upper end of the cartridge body; a seal opener disposed facing the upper sealing member and connected to the lower end of an operating shaft inserted through a guide hole in the upper end of the holder cap; an elastic member urging the seal opener in an upward direction to separate it from the upper sealing member; and a seal packing provided on the upper end surface of the seal opener and pressed onto the upper inner surface of the holder cap by the urging force of the elastic member to block an air inlet that is formed by a gap between the operating shaft and the guide hole, the operating shaft being pushed downward against the urging force of the elastic member to cause the upper sealing member to be torn open by the seal opener.

The ink cartridge of the present invention further comprises a push cap that is slidably mounted on the cap holder, the push cap having an air introducing hole that is formed through the upper end thereof and functioning to push down the operating shaft, which allows the seal opener to tear open the sealing member, when the push cap is pressed down along the holder cap against the urging force of the elastic member.

In a preferred embodiment, the push cap is normally held in a position separated from the operating shaft with an engaging pawl engaged with an engaging dent of the holder cap, the engaging pawl being disengaged from the engaging dent in such a way as to override a shoulder portion of the holder cap that is defined by the engaging dent and the periphery of the holder cap when the push cap is pressed down along the holder cap.

To supply the ink into the ink tank, one end of the cartridge body is inserted into a filler hole of the ink tank like a conventional ink cartridge, to cause the sealing member on the lower opening to be torn open by a piercing projection formed inside of the filler hole. Then, if the cartridge body is drawn out of the filler hole, since the seal opener is urged by the elastic member in the direction moving away from the upper sealing member, the upper sealing member is prevented from being torn open by an accidental operation, thereby eliminating the possibility of ink leakage.

Furthermore, when the operating shaft is pushed downward with the cartridge body inserted in the filler hole, the seal opener connected to the operating shaft is moved downward against the urging force of the elastic member to tear open the upper sealing member, while the seal packing provided on the upper end surface of the seal opener is made to separate from the upper inner surface of the holder cap. This allows air to flow into the cartridge body through the air inlet formed by the gap between the operating shaft and the guide hole, causing the ink to flow into the ink tank through the lower opening of the cartridge body. While supplying the ink, if the ink begins to leak through the filler hole, the pressing force may be released from the operating shaft to allow the resilient force of the elastic member to push the seal opener upward and press the seal packing onto the upper inner surface of the holder cap, so that the seal packing blocks the air inlet formed by the gap between the operating shaft and the guide hole to shut off the air flow to the cartridge body and thus, immediately stopping the ink from flowing into the ink tank, thereby preventing the ink from leaking due to oversupply.

Thus, the invention described herein makes possible the objectives of (1) providing an ink cartridge that can prevent ink from accidentally leaking therefrom; and (2) providing an ink cartridge that can immediately stop the ink from flowing into an ink tank, thereby making it possible to control the quantity of ink to be supplied to the ink tank according to the remaining ink level in the ink tank and also preventing the wasteful leakage of the ink due to oversupply.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
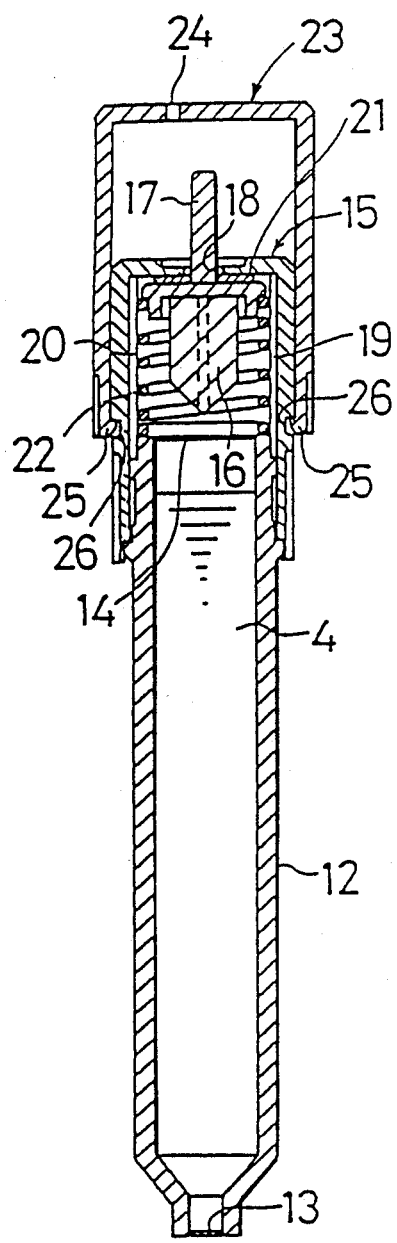
FIG. 1 is a front sectional view showing an ink cartridge of the present invention.

FIG. 1 shows an ink cartridge of the present invention, which comprises a cartridge body 12 that is formed in an approximately cylindrical shape like a conventional one, the openings at both ends thereof being respectively sealed with sealing films 13 and 14 to seal ink 4 therein.

Figure 3:
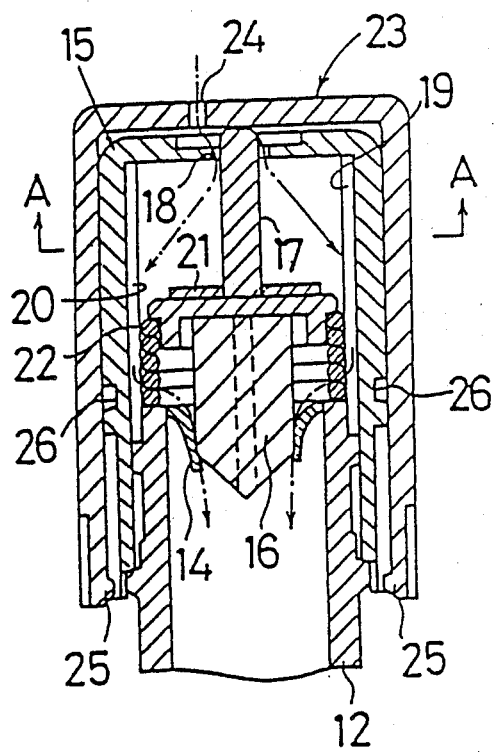
FIG. 3 is a front sectional view showing the major parts of the ink cartridge of FIG. 2.
Figure 4:
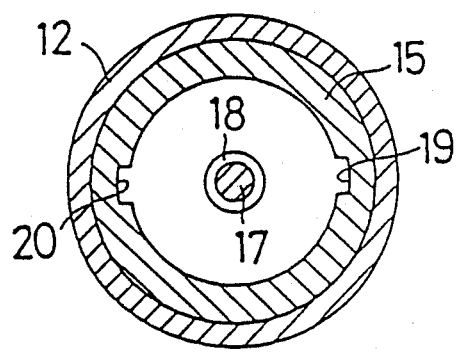
FIG. 4 is a cross sectional view taken along the line A—A in FIG. 3.

Fitted around one end of the cartridge body 12, which is positioned upward when the ink is being supplied, is a cylindrically shaped holder cap 15 having a closed end. An operating shaft 17, which is connected to a seal opener 16 disposed inside of the holder cap 15 and having a cross-shaped cross section, is inserted through a guide hole 18 formed in the upper end of the holder cap 15, and extends to the outside of the holder cap 15. As shown in FIG. 3, the gap between the operating shaft 17 and the periphery of the guide hole 18 serves as an inlet for air which flows into the holder cap 15. As shown in FIG. 4, air introducing grooves 19 and 20 are formed on the opposing inner surfaces of the holder cap 15.

A seal packing 21 is bonded to the upper end surface of the seal opener 16. Disposed between the seal opener 16 and one end of the cartridge body 12 is a compression coil return spring 22 working at all times to urge the seal opener 16 in the upward direction while at the same time pressing the seal packing 21 onto the upper inner surface of the holder cap 15 to block the air inlet that is formed by the gap between the operating shaft 17 and the periphery of the guide hole 18.

Slidably mounted on the holder cap 15 is a push cap 23 having an air introducing hole 24 formed through the upper end thereof. Normally, the push cap 23 is held in a position separated from the operating shaft 17 with an engaging pawl 25 at the lower end thereof that is engaged with a engaging dent 26 of the holder cap 15, as shown in FIG. 1. When pressed down, the push cap 23 slides downward along the holder cap 15 with the engaging pawl 25 overriding a protrusion on the holder cap 15.

We will now describe the operation of the ink cartridge in the above embodiment. Normally, as shown in FIG. 1, the seal opener 16 is urged by the resilient force of the coil spring 22 to push the seal packing 21 onto the upper inner surface of the holder cap 15, the seal packing 21 thus blocking the air inlet formed by the gap between the operating shaft 17 and the periphery of the guide hole 18, while the seal opener 16 is being held in a position separated from the sealing film 14. At the same time, the push cap 23 is held in a position separated from the operating shaft 17 with the engaging pawl 25 engaged with the engaging dent 26 of the holder cap 15. Therefore, the sealing film 14 is prevented from being torn open, thereby holding the ink 4 in a sealed condition.

Figure 6:
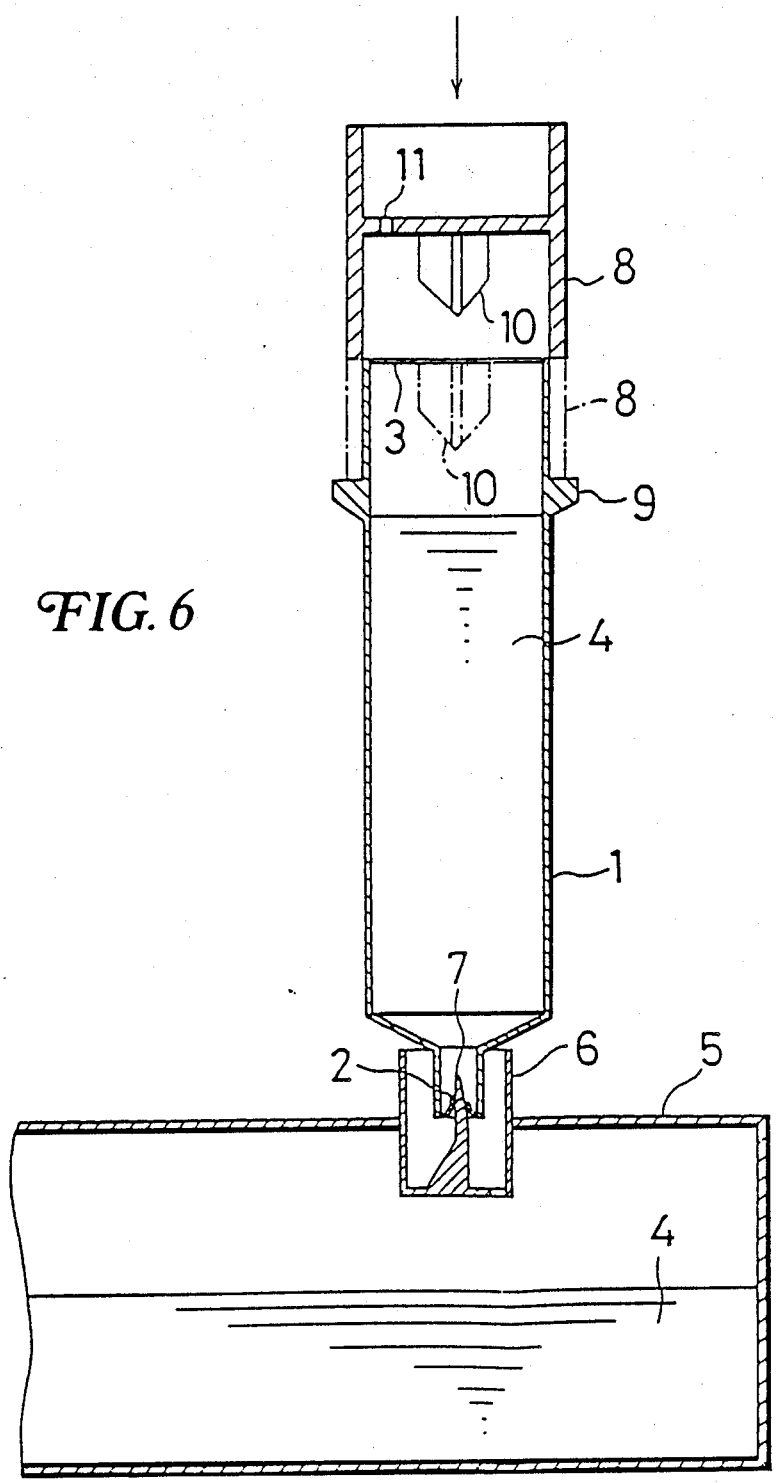
FIG. 6 is a front sectional view showing a conventional ink cartridge with an ink tank.

To supply the ink 4 into an ink tank, the other end of the cartridge body 12 is inserted into the filler hole of the ink tank in the same manner as shown in FIG. 6, to cause the other sealing film 13 to be torn open by a piercing projection formed inside of the filler hole. At this time, if the cartridge body 12 is drawn out of the filler hole to see if the sealing film 13 has properly been torn open, there is no possibility of tearing open the sealing film 14 by accidental operation because of the provision of a double protection mechanism: the air inlet formed by the gap between the operating shaft 17 and the periphery of the guide hole 18 is blocked with the seal packing 21 by means of the urging force of the coil spring 22; and the push cap 23 is held in a position separated from the operating shaft 17 with the engaging pawl 25 engaged with the engaging dent 26 of the holder cap 15.

Figure 2:
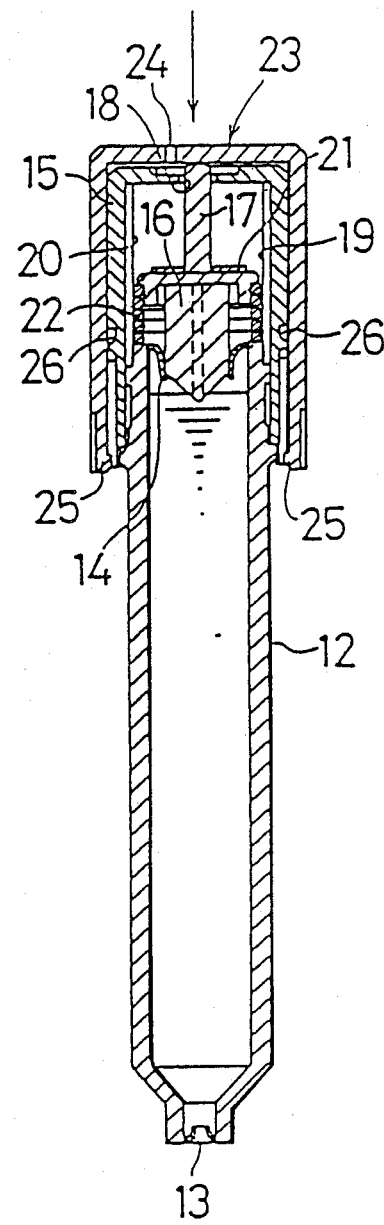
FIG. 2 is a front sectional view showing the ink cartridge of FIG. 1 in an ink-supply position.

When the push cap 23 is pressed down with the other end of the cartridge body 12 inserted in the filler hole of the ink tank, the engaging pawl 25 is disengaged from the engaging dent 26 in such a way as to override a shoulder portion of the holder cap 15 that is defined by the engaging dent 26 and the periphery of the holder cap 15, allowing the push cap 23 to slide downward along the holder cap 15 till it strikes against the operating shaft 17. When the push cap 23 is further pressed down against the urging force of the coil spring 22, the sealing film 14 is torn open by the seal opener 16, as shown in FIGS. 2 and 3, while the seal packing 21 is made to separate from the upper inner surface of the holder cap 15. This allows air to flow into the cartridge body 12, as shown by dashed lines in FIG. 3, through the air introducing hole 24, the air inlet formed by the gap between the operating shaft 17 and the periphery of the guide hole 18, the air introducing grooves 19 and 20, and the torn sealing film 14, thereby causing the ink 4 in the cartridge body 12 to flow into the ink tank.

Figure 5:
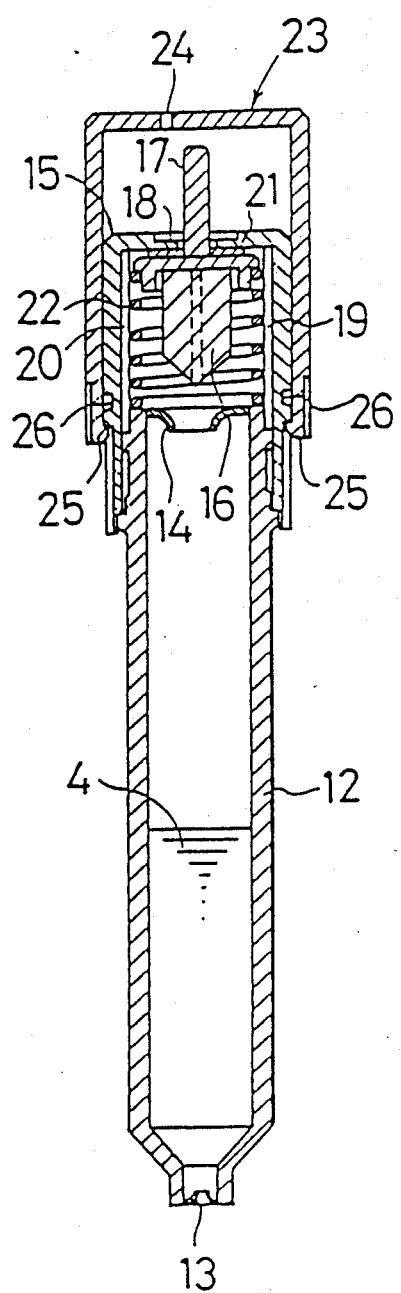
FIG. 5 is a front sectional view showing the ink cartridge of FIG. 1 when the supplying of ink is suspended during the filling process.

When the ink begins to leak through the filler hole during the filling of the tank 5, if the pressing force is released from the push cap 23, as shown in FIG. 5, the seal opener 16 is pushed upward by the resilient force of the coil spring 22 to press the seal packing 21 onto the upper inner surface of the holder cap 15, the seal packing thus blocking the air inlet formed by the gap between the operating shaft 17 and the periphery of the guide hole 18 to immediately shut off the air flow into the cartridge body 12 and thus immediately stop the flowing of the ink 4 out of the cartridge body 12.

Although only one embodiment of the invention has been disclosed and described herein, the invention is not limited to the embodiment described and illustrated in the foregoing description and the drawings. For example, the same advantage as described above can be attained if the push cap 23 is omitted and the operating shaft 17 is directly pressed down.

Because of the above-mentioned construction and function, the ink cartridge of the present invention offers the following advantages. Since the seal opener used to tear open the sealing member is urged by the elastic member in the direction moving away from the sealing member, the sealing member is kept from being torn open by accidental operation, thereby preventing the ink from accidentally leaking. Furthermore, when the pressing force is released from the operating shaft, the seal packing is pressed onto the inner surface of the holder cap by the resilient force of the elastic member to shut off the air entry and immediately stops the ink from flowing into the ink tank, thereby making it possible to control the supply quantity of the ink according to the remaining ink level in the ink tank and also preventing the wasteful leakage of the ink due to oversupply which has been a problem with the conventional ink cartridge.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An ink cartridge comprising a cylindrically shaped cartridge body, both ends of which have openings that are sealed with sealing members to seal ink in said cartridge body, said sealing members being torn open to supply the ink to an ink tank in an ink jet printer through the lower opened end of said cartridge body inserted in said ink tank; a cylindrically shaped holder cap having a closed end and fitted around the upper end of the cartridge body; a seal opener disposed facing said upper sealing member and connected to the lower end of an operating shaft inserted through a guide hole in the upper end of said holder cap; an elastic member urging said seal opener in an upward direction to separate it from said upper sealing member; and a seal packing provided on the upper end surface of said seal opener and pressed onto the upper inner surface of said holder cap by the urging force of said elastic member to block an air inlet that is formed by a gap between said operating shaft and said guide hole, said operating shaft being pushed downward against the urging force of said elastic member to cause said upper sealing member to be torn open by said seal opener.

2. An ink cartridge according to claim 1, which further comprises a push cap that is slidably mounted on said cap holder, said push cap having an air introducing hole that is formed through the upper end thereof and functioning to push down said operating shaft, which allows said seal opener to tear open said sealing member, when said push cap is pressed down along said holder cap against the urging force of said elastic member.

3. An ink cartridge according to claim 1, wherein said push cap is normally held in a position separated from said operating shaft with an engaging pawl engaged with an engaging dent of said holder cap, said engaging pawl being disengaged from said engaging dent in such a way as to override a shoulder portion of said holder cap that is defined by said engaging dent and the periphery of said holder cap when said push cap is pressed down along said holder cap.

* * * * *